(12) United States Patent
Zhang et al.

(10) Patent No.: US 11,055,401 B2
(45) Date of Patent: Jul. 6, 2021

(54) TECHNOLOGIES FOR UNTRUSTED CODE EXECUTION WITH PROCESSOR SANDBOX SUPPORT

(71) Applicant: Intel Corporation, Santa Clara, CA (US)

(72) Inventors: Mingwei Zhang, Hillsboro, OR (US); Mingqiu Sun, Beaverton, OR (US); Ravi L. Sahita, Portland, OR (US); Chunhui Zhang, Hillsboro, OR (US); Xiaoning Li, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 445 days.

(21) Appl. No.: 15/720,083

(22) Filed: Sep. 29, 2017

(65) Prior Publication Data
US 2019/0102537 A1    Apr. 4, 2019

(51) Int. Cl.
*H04L 29/00*  (2006.01)
*G06F 21/53*  (2013.01)
*G06F 8/41*   (2018.01)
*G06F 9/38*   (2018.01)
*G06F 21/12*  (2013.01)

(52) U.S. Cl.
CPC .............. *G06F 21/53* (2013.01); *G06F 8/441* (2013.01); *G06F 9/3836* (2013.01); *G06F 21/126* (2013.01); *G06F 2221/2143* (2013.01)

(58) Field of Classification Search
CPC ......... G06F 8/441; G06F 21/53; G06F 9/3836
USPC ........................................................ 726/26
See application file for complete search history.

(56) References Cited

U.S. PATENT DOCUMENTS 8,245,270 B2 *   8/2012   Cooperstein ............ G06F 21/53
                                                          709/203

FOREIGN PATENT DOCUMENTS

WO   WO-2013174503 A1 *  11/2013  ............. G06F 21/53

OTHER PUBLICATIONS

Stephen McCamant, Greg Morrisett/ Efficient, Verifiable Binary Sandboxing for CISC Archetecture/ May 2005/ MIT/pp. 1-17 (Year: 2005).*

(Continued)

*Primary Examiner* — Morshed Mehedi
*Assistant Examiner* — Michael D Anderson
(74) *Attorney, Agent, or Firm* — Jaffery Watson Mendonsa & Hamilton LLP

(57) ABSTRACT

Technologies for untrusted code execution include a computing device having a processor with sandbox support. The computing device executes code included in a native domain in a non-privileged, native processor mode. The computing device may invoke a sandbox jump processor instruction during execution of the code in the native domain to enter a sandbox domain. The computing device executes code in the sandbox domain in a non-privileged, sandbox processor mode in response to invoking the sandbox jump instruction. While executing in the sandbox processor mode, the processor denies access to memory outside of the sandbox domain and may deny execution of one or more prohibited instructions. From the sandbox domain, the computing device may execute a sandbox exit instruction to exit the sandbox domain and resume execution in the native domain. The computing device may execute processor instructions to configure the sandbox domain. Other embodiments are described and claimed.

25 Claims, 5 Drawing Sheets

(56) References Cited

OTHER PUBLICATIONS

Jason Ansel, Petr Marchenko/ Language Independent Sandboxing of Just In Time Compiliation and selfmodifying Code/2011/Google Inc./ pp. 355-366 (Year: 2011).*

* cited by examiner

TECHNOLOGIES FOR UNTRUSTED CODE EXECUTION WITH PROCESSOR SANDBOX SUPPORT

BACKGROUND

Typical computing devices may execute numerous small, untrusted code components. For example, a computing device may execute plugins, applets, applications, or other third-party code components downloaded from the Internet. In current computing devices, untrusted code may be separated from trusted code by a process boundary or a ring boundary. Intel® page protection keys may protect a small number (e.g., 16) of domains of a process address space from accidental read or write memory access, for example caused by programming errors. Page protection keys may not protect from malicious attackers that manipulate the protection keys themselves. Typical computing devices may also implement software-based isolation to execute untrusted code within a user process. For example, Google® Native Client (NaCl) implements a custom toolchain to ensure that code executed within a software-based sandbox cannot jump out of the sandbox, except through specific trampoline routines.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
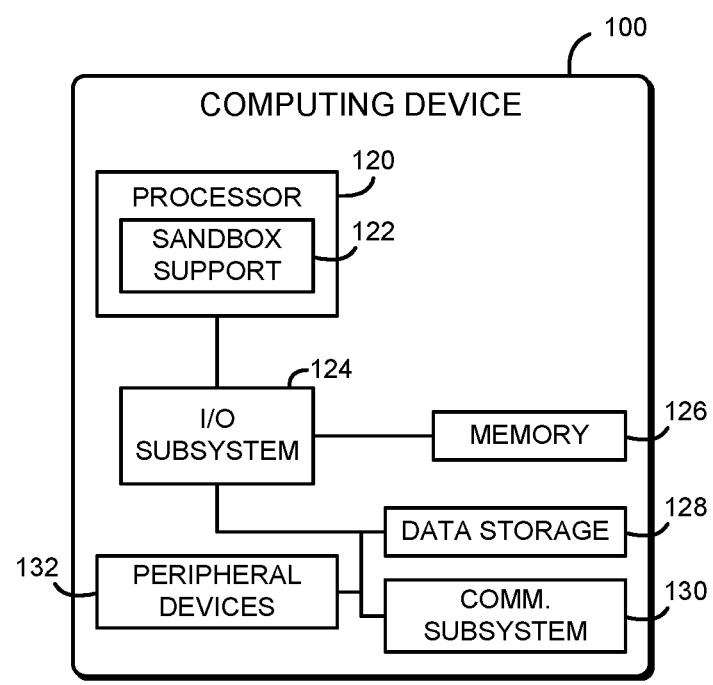
FIG. 1 is a simplified block diagram of at least one embodiment of a computing device for untrusted code execution.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a computing device 100 for untrusted code execution is shown. As shown, the computing device 100 includes a processor 120 that includes sandbox support 122. In use, as described in more detail below, the computing device 100 executes unprivileged code (e.g., user-level code) from a native domain in a native processor mode. The computing device 100 may add memory pages to one or more sandbox domains and then jump to an entry point within the sandbox domain using the sandbox support 122. The computing device 100 executes the code within the sandbox domain in a sandbox processor mode, in which memory accesses outside of the sandbox domain as well as certain processor instructions are disallowed. The computing device 100 may jump back to the native domain using the sandbox support 122. The native domain and the sandbox domains may be included in the same virtual address space. Thus, the computing device 100 may enable user-level configuration and management of multiple untrusted sandbox domains. The computing device 100 may provide memory protection for different domains in the same address space, without requiring potentially expensive context switches or permission level changes (e.g., ring level changes, hypercalls, or other security boundary crossings). Thus, the computing device 100 may improve performance for certain applications, particularly for workloads that perform frequent cross-boundary interactions. Additionally, the computing device 100 may perform sandbox isolation without extensive, specialized toolchain support (e.g., without extensive changes to the compiler, linker, or other toolchain components) and, by removing software overhead, may provide improved performance over software-only isolation techniques.

The computing device 100 may be embodied as any type of computation or computer device capable of performing the functions described herein, including, without limitation, a computer, a multiprocessor system, a server, a rack-mounted server, a blade server, a laptop computer, a notebook computer, a tablet computer, a wearable computing device, a network appliance, a web appliance, an embedded system, a distributed computing system, a processor-based system, and/or a consumer electronic device. As shown in FIG. 1, the computing device 100 illustratively includes a processor 120, an input/output subsystem 124, a memory 126, a data storage device 128, and a communication subsystem 130. Of course, the computing device 100 may include other or additional components, such as those commonly found in a server (e.g., various input/output devices), in other embodiments. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. As shown, the processor 120 includes the sandbox support 122. The sandbox support 122 may be embodied as any hardware, firmware, microcode, other resources of the processor 120 that provides sandbox protection as described further below. For example, the sandbox support 122 may include instruction set architecture (ISA) extensions, model-specific registers, and/or other processor features to support configuration of sandbox domains, entering and exiting sandboxing domains, and enforcing sandbox protections.

Similarly, the memory 126 may be embodied as any type of volatile or non-volatile memory or data storage capable of performing the functions described herein. In operation, the memory 126 may store various data and software used during operation of the computing device 100 such as operating systems, applications, programs, libraries, and drivers. The memory 126 is communicatively coupled to the processor 120 via the I/O subsystem 124, which may be embodied as circuitry and/or components to facilitate input/output operations with the processor 120, the memory 126, and other components of the computing device 100. For example, the I/O subsystem 124 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processors 120, the memory 126, and other components of the computing device 100, on a single integrated circuit chip.

The data storage device 128 may be embodied as any type of device or devices configured for short-term or long-term storage of data such as, for example, memory devices and circuits, memory cards, hard disk drives, solid-state drives, or other data storage devices. The communication subsystem 130 of the computing device 100 may be embodied as any communication circuit, device, or collection thereof, capable of enabling communications between the computing device 100 and other remote devices over a network. The communication subsystem 130 may be configured to use any one or more communication technology (e.g., wired or wireless communications) and associated protocols (e.g., Ethernet, Bluetooth®, Wi-Fi®, WiMAX, etc.) to effect such communication.

As shown, the computing device 100 may also include one or more peripheral devices 132. The peripheral devices 132 may include any number of additional input/output devices, interface devices, and/or other peripheral devices. For example, in some embodiments, the peripheral devices 132 may include a display, touch screen, graphics circuitry, keyboard, mouse, speaker system, microphone, network interface, and/or other input/output devices, interface devices, and/or peripheral devices.

Figure 2:
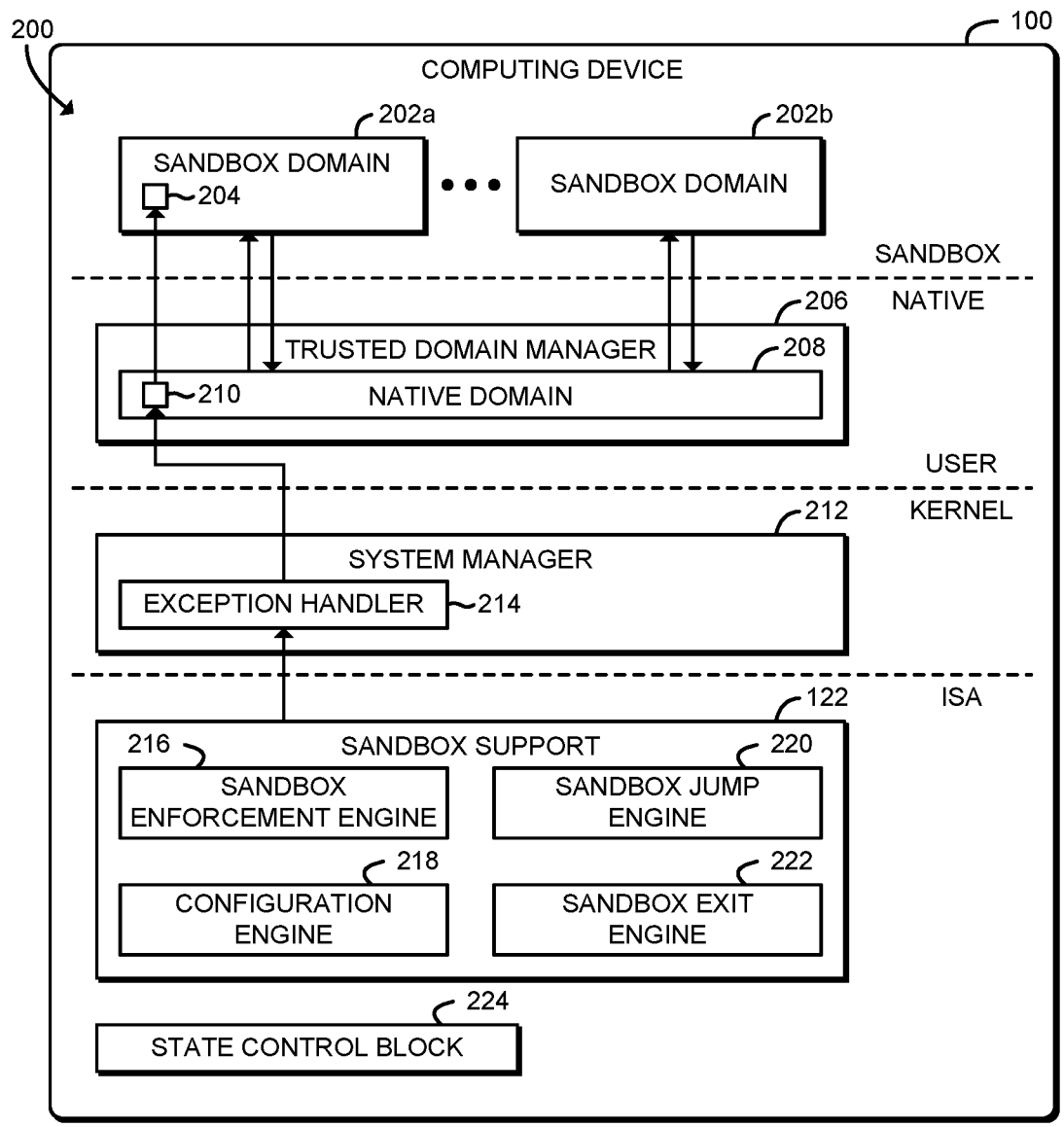
FIG. 2 is a simplified block diagram of at least one embodiment of an environment that may be established by the computing device of FIG. 1.

Referring now to FIG. 2, in an illustrative embodiment, the computing device 100 establishes an environment 200 during operation. The illustrative environment 200 includes a trusted domain manager 206, a system manager 212, and the sandbox support 122 of the processor 120. As shown, the sandbox support 122 further includes a sandbox enforcement engine 216, a configuration engine 218, a sandbox jump engine 220, and a sandbox exit engine 222. The various components of the environment 200 may be embodied as hardware, firmware, processor microcode, software, or a combination thereof. As such, in some embodiments, one or more of the components of the environment 200 may be embodied as circuitry or collection of electrical devices (e.g., trusted domain manager circuitry 206, system manager circuitry 212, sandbox enforcement circuitry 216, configuration circuitry 218, sandbox jump circuitry 220, and/or sandbox exit circuitry 222). It should be appreciated that, in such embodiments, one or more of the trusted domain manager circuitry 206, the system manager circuitry 212, the sandbox enforcement circuitry 216, the configuration circuitry 218, the sandbox jump circuitry 220, and/or the sandbox exit circuitry 222 may form a portion of one or more of the processor 120, the I/O subsystem 124, and/or other components of the computing device 100. Additionally, in some embodiments, one or more of the illustrative components may form a portion of another component and/or one or more of the illustrative components may be independent of one another.

The trusted domain manager 206 may execute in a non-privileged operating mode (e.g., user mode or ring level 3). The trusted domain manager 206 is configured to execute code included in a native domain 208 in a non-privileged native processor mode. The trusted domain manager 206 is further configured to invoke a sandbox_allocate instruction while in the native processor mode to add one or more memory pages to a corresponding sandbox domain 202 and may be configured to invoke a sandbox_free instruction while in the native processor mode to remove one or more memory pages from a corresponding sandbox domain 202. The trusted domain manager 206 may be configured to configure a sandbox state for a sandbox domain 202 and to invoke a sandbox_set_state instruction to set the sandbox state for the sandbox domain 202 while in the native processor mode. The trusted domain manager 206 is further configured to invoke a sandbox_jump instruction while in the native processor mode to enter a specified sandbox domain 202.

The trusted domain manager 206 is further configured to execute code included in a sandbox domain 202 in a non-privileged sandbox processor mode in response invoking the sandbox_jump instruction. The sandbox domain 202 is included in the same virtual address space as the native domain 208, for example in the same process. Memory pages included in the sandbox domain 202 are not included in the native domain 208. The illustrative environment 200 includes two sandbox domains 202a, 202b; however, in other embodiments the environment may include any number of sandbox domains 202. The code included in the sandbox domain 202 may invoke a sandbox_exit instruction to exit the sandbox domain 202 while executing in the sandbox processor mode.

The sandbox enforcement engine 216 is configured to enforce the sandbox processor mode by generating an exception in response to a sandbox violation. The sandbox enforcement engine 216 may be configured to allow access to memory included in the current sandbox domain 202 while executing in the sandbox processor mode and to deny access to memory not included in the current sandbox domain 202 (e.g., in the native domain 208 and/or other sandbox domains 202). The sandbox enforcement engine 216 may deny read access, write access, and execute access to memory not included in the current sandbox domain 202, for example by generating a page fault exception. The sandbox enforcement engine 216 may be further configured to deny execution of one or more prohibited instructions while executing in the sandbox processor mode, for example by generating a general protection fault exception. The prohibited instructions may include, for example, all system call-related instructions.

The configuration engine 218 is configured to configure a state control block 224 in the memory 126 in response to invoking a sandbox_set_state instruction. The state control block 224 may be embodied as a per-thread data structure in the memory 126. The state control block 224 is managed by the processor 120. The state control block 224 may be located in the normal domain 208 or in kernel space, or in some embodiments may be inaccessible to software executed by the computing device 100. The state control block 224 may not be directly modified by any sandbox domain 202. The state control block 224 may be configured to include a stack pointer that points within the sandbox domain 202, an entry point within the sandbox domain 202, or other sandbox state. The configuration engine 218 may also be configured to add or remove memory pages from a sandbox domain 202 in response to invoking a sandbox_allocate instruction or a sandbox_free instruction, respectively.

The sandbox jump engine 220 is configured to set a sandbox bit in the state control block 224, store a return address in the state control block 224, load an execution state from the state control block 224, and jump to an entry point within a sandbox domain 202 in response to invoking the sandbox_jump instruction. The return address stored in the state control block 224 points to an address within the native domain 208. The sandbox exit engine 222 is configured to clear the sandbox bit in the state control block 224 and to jump to the return address stored in the state control block 224 in response to invoking a sandbox_exit instruction.

The system manager 212 may be embodied as or otherwise include an operating system, hypervisor, virtual machine monitor, and/or other privileged management component of the computing device 100. Thus, the system manager 212 may execute in a privileged operating mode (e.g., kernel mode or ring level 0). The system manager 212 is configured to execute a kernel exception handler 214 in a privileged processor mode in response to an exception generated by the processor 120. The system manager 212 may be configured to invoke a non-privileged exception handler 210 in the non-privileged, native processor mode in response to execution of the kernel exception handler 214. The trusted domain manager 206 may be further configured to read a sandbox status register of the processor 120 in response to executing the non-privileged exception handler 210 and determine whether the exception originated in the non-privileged sandbox processor mode. If the exception originated in the sandbox processor mode, the trusted domain manager 206 may be further configured to invoke the sandbox_jump processor instruction to enter the non-privileged sandbox processor mode to execute a sandbox domain exception handler 204. The trusted domain manager 206 may perform one or more checks before entering the non-privileged sandbox processor mode. For example, if the exception is generated by untrusted code attempting to exit the sandbox domain 202, the trusted domain manager 206 may not pass control back to the sandbox domain exception handler 204.

Figure 3A:
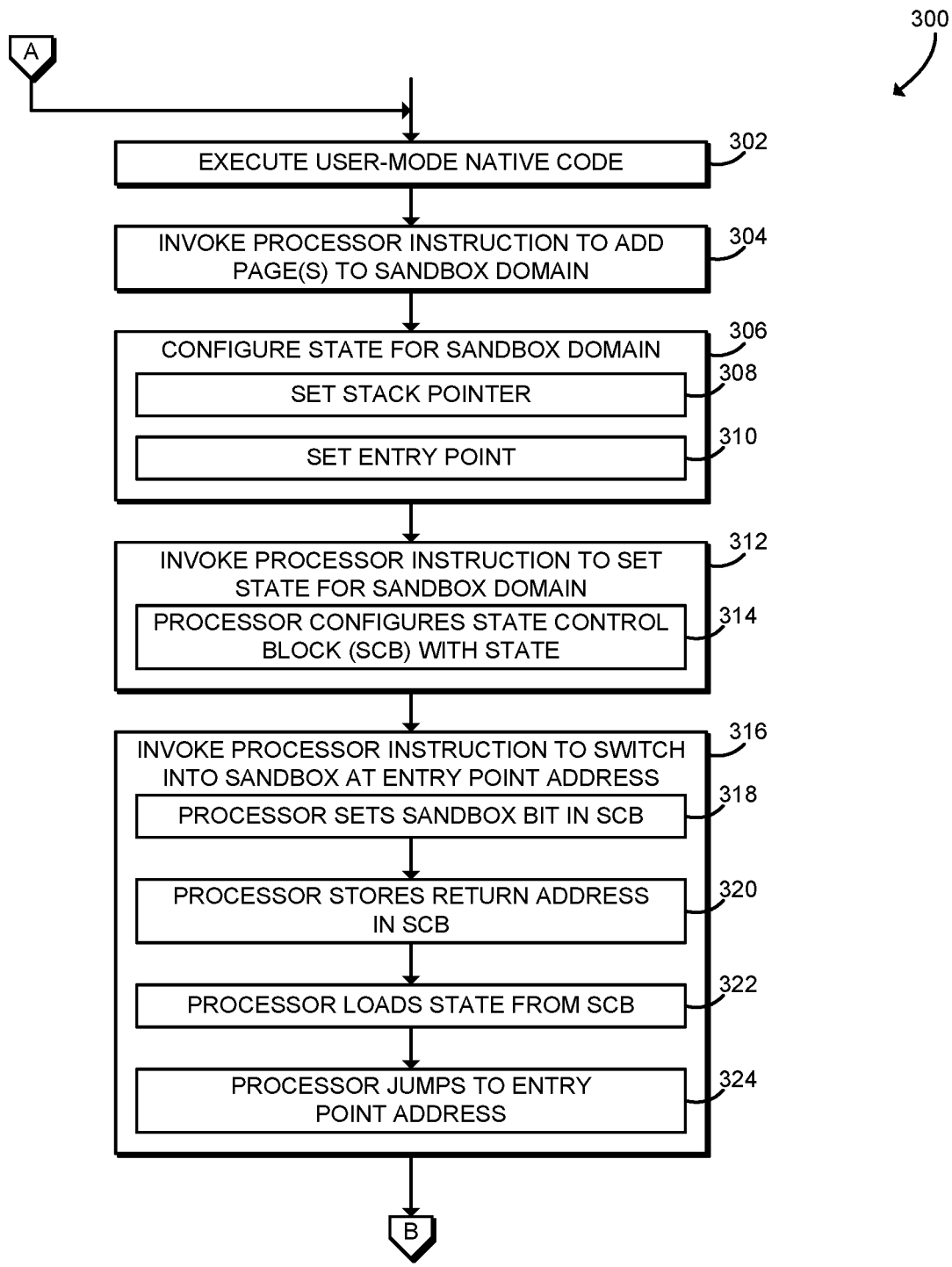
FIGS. 3A and 3B are a simplified flow diagram of at least one embodiment of a method for untrusted code execution that may be executed by the computing device of FIGS. 1-2.
Figure 3B:
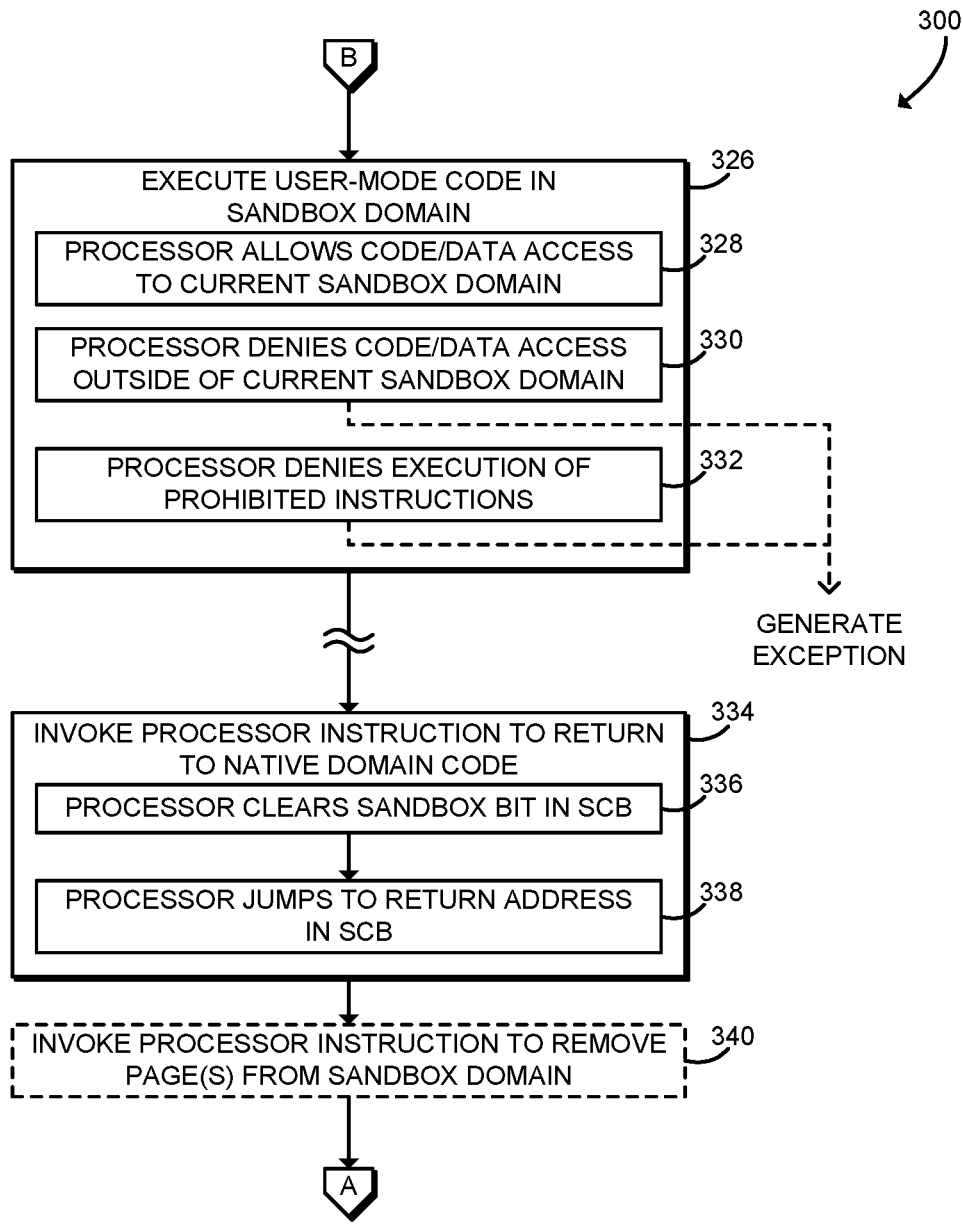

Referring now to FIGS. 3A and 3B, in use, the computing device 100 may execute a method 300 for untrusted code execution. It should be appreciated that, in some embodiments, the operations of the method 300 may be performed by one or more components of the environment 200 of the computing device 100 as shown in FIG. 2. The method 300 begins in block 302, in which the computing device 100 executes code from the native domain 208 in a user-level, native processor mode. For example, the processor 120 may execute in a non-privileged mode such as ring level 3. The processor 120 executes code in the normal domain 208 without sandboxing enabled, for example, with the sandbox bit of the state control block 224 cleared.

In block 304, the computing device 100 invokes a sandbox_allocate instruction to add one or more memory pages to a sandbox domain 202. For example, an application executing in the normal domain 208 may add memory pages associated with a downloaded applet, plug-in, or other untrusted code to the sandbox domain 202. The computing device 100 may invoke the instruction with one or more parameters, including a linear address or other identifier of the memory page to add to the sandbox domain 202 as well as a domain identifier of the sandbox domain 202. The processor 120 may use any technique to track or otherwise add the memory page to the sandbox domain 202. The computing device 100 may invoke the sandbox_allocate instruction multiple times to add additional memory pages to the sandbox domain 202. The processor 120 may return an error if a memory page has already been allocated to a different sandbox domain 202.

In block 306, the computing device 100 configures the state for the sandbox domain 202. The computing device 100 may, for example, configure initial values that will be loaded into all of the general purpose registers of the processor 120 when entering the sandbox domain 202. The computing device 100 may configure the state in the memory 126, for example in an in-memory data structure in the normal domain 208. In block 308, the computing device 100 sets a stack pointer value (e.g., RSP, ESP, or other stack pointer register). The stack pointer value pointers to an address within the sandbox domain 202 that will be used for stack space during execution in the sandbox domain 202. In block 310, the computing device 100 sets an entry point (e.g., RIP, EIP, or other instruction pointer register). The entry point may be embodied as an address within the sandbox domain 202.

In block 312, the computing device 100 invokes a sandbox_set_state processor instruction to set the state for the sandbox domain 202. The computing device 100 may invoke the instruction with one or more parameters, including a pointer to a data structure that includes the state as well as the domain identifier of the sandbox domain 202. In block 314, the processor 120 configures the state control block 224 based on the provided state data. The processor 120 may, for example, copy one or more values to the state control block 224, including the stack pointer value and entry point value.

In block 316, the computing device 100 invokes a sandbox_jump instruction to switch to the sandbox domain 202 at the entry point address. The sandbox_jump instruction may be executed in an unprivileged (e.g., user-mode), native processor mode. The computing device 100 may invoke the instruction with one or more parameters, including a linear address or other identifier of a memory page in the sandbox domain 202. For example, parameters may be used to indicate when the sandbox domain 202 is entered for the first time, when the sandbox domain 202 is entered to return to a saved state in the sandbox, and/or when an exception handler in the sandbox domain 202 is executed. In those examples, the parameter may identify the state control block 224, and the state control block 224 may include an ordinary entry point, an exception handling entry point, and an exception bit. When the exception bit is cleared, the processor 120 may jump to the ordinary entry point, and when the exception bit is set the processor 120 may jump to the exception handling entry point.

In block 318, in response to invoking the sandbox_jump instruction, the processor 120 sets a sandbox bit in the state control block 224. Setting the sandbox bit indicates that the processor 120 is executing in the sandbox mode and thus enforces sandbox protections. In block 320 the processor 120 stores a return address in the state control block 224. The return address may be any address within the native domain 208 at which native (i.e., non-sandboxed) execution may resume. For example, the return address may be the address of the next instruction following the sandbox_jump instruction. In block 322, the processor 120 loads state from the state control block 224. For example, the processor 120 may load values for all general-purpose registers, including the stack pointer and instruction pointer, from the state control block 224. In block 324, the processor 120 jumps to the entry point address within the sandbox domain 202.

In block 326, shown in FIG. 3B, the computing device 100 executes code from the sandbox domain 202 in a user-level, sandbox processor mode. For example, the processor 120 may execute in a non-privileged mode such as ring level 3. The computing device 100 may execute the sandbox domain 202 in the same virtual address space as the native domain 208 (e.g., in the same process space) and thus may continue execution without a context switch or ring level transition. While executing in the sandbox mode, the processor 120 enforces sandbox protections.

In block 328, the processor 120 allows code and/or data accesses to memory pages within the current sandbox domain 202. For example, the processor 120 may allow read, write, and execute access to memory addresses within the current sandbox domain 202. Of course, the processor 120 may continue to apply page table (or extended page table) permissions to the memory accesses. In block 330, the processor 120 may deny code and/or data access to memory pages outside of the current sandbox domain. For example, as illustrated in FIG. 2, when executing in the sandbox domain 202a, the processor 120 may deny read, write, and execute access to memory locations within the native domain 208 or within any other sandbox domains 202 (e.g., the sandbox domain 202b). The processor 120 may deny access by generating an exception such as a page fault exception. One method for exception handling that may be executed by the computing device 100 is described below in connection with FIG. 4.

In block 332, the processor 120 may deny execution of one or more prohibited instructions. The prohibited instructions may include instructions that generate a software interrupt or otherwise attempt to exit user-level code such as SYSCALL, INT, VMCALL, or similar instructions. The prohibited instructions may also include instructions that flush the cache, such as RDTSC. The prohibited instructions may also include instructions that manage sandbox domains 202, such as sandbox_allocate, sandbox_free, sandbox_set_state, or sandbox_jump. The processor 120 may deny execution of a prohibited instruction by generating an exception such as a general protection fault exception. One method for exception handling that may be executed by the computing device 100 is described below in connection with FIG. 4.

The computing device 100 continues to execute user-mode code from the sandbox domain 202 in a user-level, sandbox processor mode until, in block 334, the computing device 100 invokes a sandbox_exit instruction to switch to the native domain 208 at the return address that was previously stored in the state control block 224. Invoking the sandbox_exit instruction may be the exclusive technique for the sandbox code to request an exit from the sandbox domain 202 (without, for example, generating an exception or other error). The sandbox_exit instruction may be invoked, for example, to request a privileged service from the normal domain (e.g., to request file open, read, write, or close, to allocate or deallocate memory, or to perform other privileged operations). The native domain 208 code may apply one or more security policies or otherwise determine whether to service a request from the sandbox 204. Note that timer interrupts (e.g., time slice expiration) and other interrupts to the kernel may be handled in kernel mode, without generating an exit from the sandbox domain. In some embodiments, the kernel may not be aware of the existence of the sandbox domain 204. The sandbox_exit instruction may be invoked without any additional parameters. In block 336, in response to executing the sandbox_exit instruction, the processor 120 clears the sandbox bit in the state control block 224. Clearing the sandbox bit indicates that the processor 120 is executing in the native mode and thus does not enforce sandbox protections. In block 338, the processor 120 jumps to the return address that was stored in the state control block 224.

In block 340, in some embodiments, the computing device 100 may invoke a sandbox_free instruction to remove one or more memory pages from the sandbox domain 202. For example, an application executing in the normal domain 208 may remove memory pages associated with a downloaded applet, plug-in, or other untrusted code from the sandbox domain 202 after execution of the untrusted code is completed. The computing device 100 may invoke the instruction with one or more parameters, including a linear address or other identifier of the memory page to remove from the sandbox domain 202 as well as the domain identifier of the sandbox domain 202. The processor 120 may use any technique to remove the memory page from the sandbox domain 202. The computing device 100 may invoke the sandbox_free instruction multiple times to remove additional memory pages from the sandbox domain 202. After removing any memory pages, the method 300 loops back to block 302, shown in FIG. 3A, to continue executing untrusted code.

Figure 4:
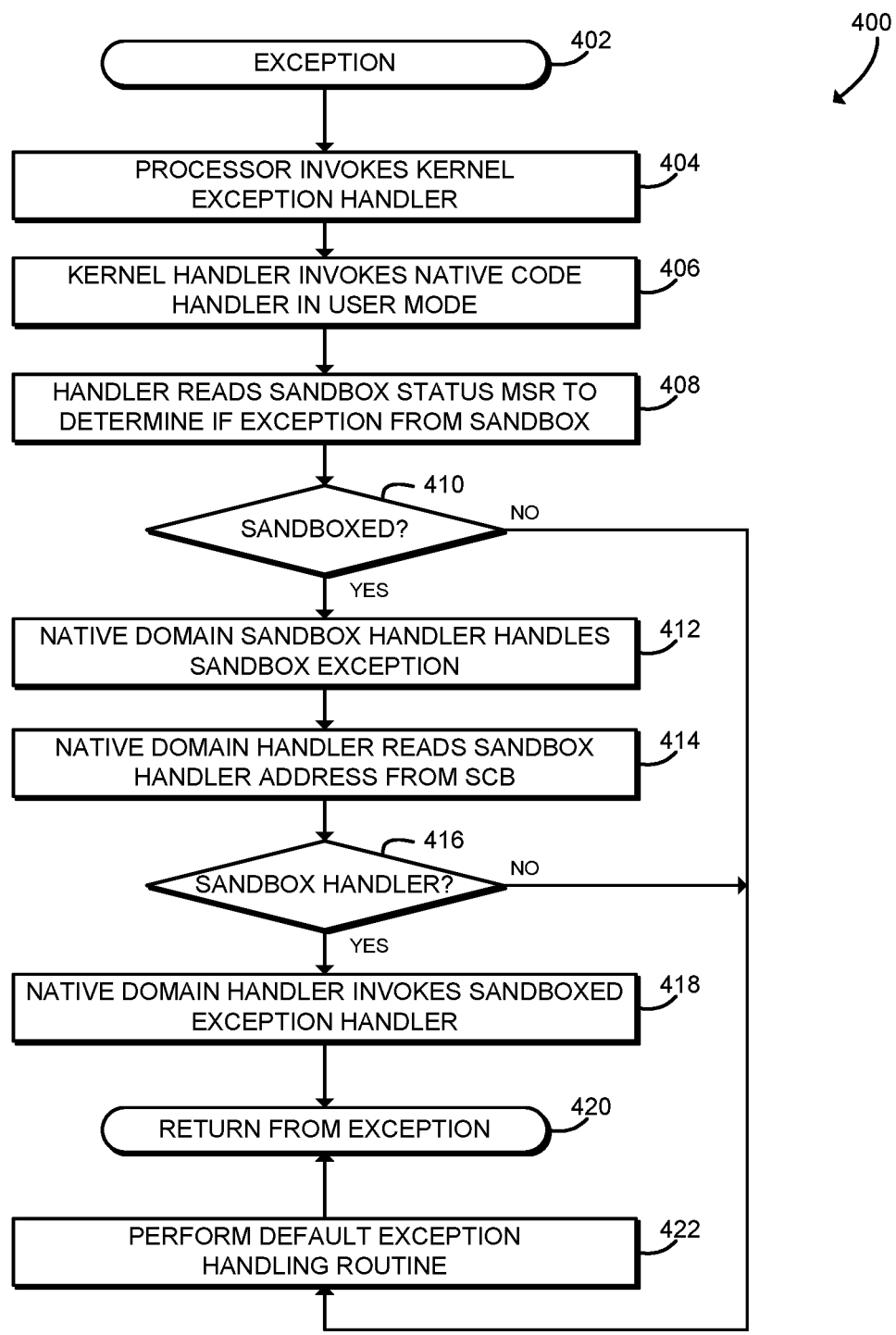
FIG. 4 is a simplified flow diagram of at least one embodiment of a method for exception handling that may be executed by the computing device of FIGS. 1-2.

Referring now to FIG. 4, in use, the computing device 100 may execute a method 400 for exception handling. It should be appreciated that, in some embodiments, the operations of the method 400 may be performed by one or more components of the environment 200 of the computing device 100 as shown in FIG. 2. The method 400 begins in block 402, in which the computing device 100 generates an exception, fault, interrupt, trap, or other exceptional condition. The exception may generated while executing in the sandbox mode, for example in response to a sandbox violation, or in other circumstances.

In block 404, the processor 120 invokes the kernel exception handler 214. The processor 120 may perform a typical interrupt handling process, for example by pushing an interrupt frame onto the kernel stack and then invoking the exception handler 214 in a privileged processor mode, such as ring level 0. Because the kernel exception handler 214 executes in a privileged mode, the processor 120 does not enforce sandbox protections. In block 406, the kernel exception handler 214 invokes a sandbox handler in the user mode. For example, the kernel exception handler 214 may invoke the native domain exception handler 210. The native domain exception handler 210 may be registered with the kernel exception handler 214 by the native domain 208 and thus may be trusted. The kernel exception handler 214 may clear the sandbox bit in the state control block 224, allowing the user-mode code to execute in the normal mode (and not the sandbox mode).

In block 408, the native domain exception handler 212 reads a sandbox status model-specific register (MSR) of the processor 120 to determine if the exception originated from a sandbox domain 202. When the exception is generated, the processor 120 sets the sandbox status MSR to indicate whether the exception originates from a sandbox domain 202. In block 410, the kernel exception handler 214 determines whether the exception originated from a sandbox domain 202. If not, the method 400 branches ahead to block 422, described below. If the exception does originate from a sandbox domain 202, the method 400 advances to block 412.

In block 412, the user-mode native code sandbox handler 210 handles the sandbox exception. For example, the handler 210 may free or otherwise unload the sandbox domain 202 that generated the exception or otherwise handle the sandbox exception. In some embodiments, the user-mode native code sandbox handler 210 may perform one or more checks or other security policy determinations to determine whether to allow the exception to be handled by the sandbox domain 202. For example, the sandbox domain 202 may be allowed to handle exceptions unless the exception was caused by code in the sandbox domain 202 attempting to exit the sandbox.

In block 414, the native domain exception handler 212 reads a sandbox handler field of the SCB to determine whether a sandbox exception handler has been designated. For example, the sandbox handler may be configured by the native domain to point to a sandbox exception handler 204 within the sandbox domain 204. In block 416, the native domain handler 212 determines whether to invoke a sandbox exception handler. For example, the sandbox handler field may be null or otherwise invalid if no sandbox exception handler has been designated. Alternatively, the native domain handler 210 may determine whether to invoke the sandbox exception handler based on one or more security policies or other factors. If a sandbox exception handler will not be invoked, the method 400 branches to block 422, as described below. If a sandbox exception handler will be invoked, the method 400 advances to block 418.

In block 418 the user-mode native exception handler 210 may invoke a sandbox exception handler 204. The sandbox exception handler 204 may be invoked in the sandbox mode, for example by invoking the sandbox_jump instruction. The sandbox exception handler 204 may perform any appropriate exception handling routines. After the native code sandbox handler 210 and/or the sandbox exception handler 204 handles the exception, the method 400 branches to block 420, in which the computing device 100 returns from handling the exception. After returning, the method 400 is completed.

Referring back to blocks 408, 412, if the exception did not originate from a sandbox or not sandbox exception handler is invoked, the method 400 may branch to block 422. In block 422, the computing device 100 performs a default exception handling routine. For example, the computing device 100 may terminate the user-level process that generated the exception or perform other management operations. After performing the default exception handling routine, the method 400 branches to block 420, in which the computing device 100 returns from handling the exception. After returning, the method 400 is completed.

Although FIG. 4 illustrates that the native domain exception handler 210 reads the sandbox status MSR and determines whether to invoke a sandbox exception handler, it should be understood that in some embodiments those operations may be performed by one or more other components of the computing device 100. For example, in some embodiments those operations may be performed by the kernel exception handler 214.

It should be appreciated that, in some embodiments, the methods 300 and/or 400 may be embodied as various instructions stored on a computer-readable media, which may be executed by the processor 120 and/or other components of the computing device 100 to cause the computing device 100 to perform the respective method 300 and/or 400. The computer-readable media may be embodied as any type of media capable of being read by the computing device 100 including, but not limited to, the memory 126, the data storage device 128, firmware devices, other memory or data storage devices of the computing device 100, portable media readable by a peripheral device 132 of the computing device 100, and/or other media.

EXAMPLES

Illustrative examples of the technologies disclosed herein are provided below. An embodiment of the technologies may include any one or more, and any combination of, the examples described below.

Example 1 includes a computing device for untrusted code execution, the computing device comprising a trusted domain manager to: execute code included in a native domain of a first virtual address space in a non-privileged, native processor mode; invoke, during execution of the code in the native processor mode, a first processor instruction to add a memory page to a first sandbox domain of the first virtual address space, wherein the memory page is not included in the native domain; invoke, during the execution of the code in the native processor mode, a second processor instruction to enter the first sandbox domain in response to invocation of the first processor instruction; and execute code included in the first sandbox domain in a non-privileged, sandbox processor mode in response to invocation of the second processor instruction.

Example 2 includes the subject matter of Examples 1, and wherein to execute the code included in the first sandbox domain in the non-privileged, sandbox processor mode comprises to: allow, by a processor of the computing device, access to memory included in the first sandbox domain; and deny, by the processor of the computing device, access to memory not included in the first sandbox domain.

Example 3 includes the subject matter of any of Examples 1 and 2, and wherein to deny the access to memory comprises to deny read access, write access, and execute access to the memory not included in the first sandbox domain.

Example 4 includes the subject matter of any of Examples 1-3, and wherein to deny the access to the memory not included in the first sandbox domain comprises to generate, by the processor, a page fault exception.

Example 5 includes the subject matter of any of Examples 1-4, and wherein to execute the code included in the first sandbox domain in the non-privileged, sandbox processor mode comprises to deny, by a processor of the computing device, execution of a prohibited instruction.

Example 6 includes the subject matter of any of Examples 1-5, and wherein to deny the execution of the prohibited instruction comprises to generate, by the processor, a general protection fault exception.

Example 7 includes the subject matter of any of Examples 1-6, and wherein the trusted domain manager is further to: configure, during the execution of the user-mode code in the native processor mode, a sandbox state for the first sandbox domain; and invoke a third processor instruction to set the sandbox state for the first sandbox domain in response to configuration of the sandbox state; wherein to invoke the second processor instruction comprises to invoke the second processor instruction in response to invocation of the third processor instruction.

Example 8 includes the subject matter of any of Examples 1-7, and wherein the sandbox state is indicative of a stack pointer that points within the first sandbox domain and an entry point within the first sandbox domain.

Example 9 includes the subject matter of any of Examples 1-8, and further comprising a processor, wherein the processor includes a configuration engine to configure a state control block in a memory of the computing device with the sandbox state in response to invocation of the third processor instruction.

Example 10 includes the subject matter of any of Examples 1-9, and further comprising a processor, wherein the processor includes a sandbox jump engine to: set a sandbox bit in a memory of the computing device in response to invocation of the second processor instruction; store a return address in the memory of the computing device in response to the invocation of the second processor instruction; load an execution state from the memory of the computing device in response to the invocation of the second processor instruction; and jump to an entry point within the first sandbox domain in response to the invocation of the second processor instruction.

Example 11 includes the subject matter of any of Examples 1-10, and wherein to load the execution state comprises to: load a stack pointer from the memory to a stack pointer register of the processor; and load the entry point from the memory to an instruction pointer register of the processor.

Example 12 includes the subject matter of any of Examples 1-11, and wherein: to set the sandbox bit comprises to set a sandbox bit of a state control block in the memory of the computing device; to store the return address comprises to store the return address in the state control block; and to load the execution state comprises to load the execution state from the state control block.

Example 13 includes the subject matter of any of Examples 1-12, and wherein: to execute the code in the sandbox processor mode comprises to invoke a third processor instruction to exit the first sandbox domain; and the trusted domain manager is further to execute the code included in the native domain of the first virtual address space in the non-privileged, native processor mode in response to invocation of the third processor instruction.

Example 14 includes the subject matter of any of Examples 1-13, and further comprising a processor, wherein: the processor includes a sandbox jump engine to set a sandbox bit in a memory of the computing device in response to invocation of the second processor instruction; and the processor includes a sandbox exit engine to clear the sandbox bit in the memory in response to invocation of the third processor instruction.

Example 15 includes the subject matter of any of Examples 1-14, and further comprising a processor, wherein: the processor includes a sandbox jump engine to store a return address that points to the native domain in a memory of the computing device in response to invocation of the second processor instruction; and the processor includes a sandbox exit engine to jump to the return address in response to invocation of the third processor instruction.

Example 16 includes the subject matter of any of Examples 1-15, and further comprising: a processor that includes a sandbox enforcement engine to generate an exception during execution of the code included in the first sandbox domain in the non-privileged, sandbox processor mode; and a system manager to (i) execute a kernel exception handler in a privileged processor mode in response to generation of the exception and (ii) invoke a non-privileged exception handler in the non-privileged, native processor mode in response to execution of the kernel exception handler; wherein the trusted domain manager is further to (i) read a sandbox status register of the processor in response to execution of the non-privileged exception handler and (ii) determine whether the exception originated in the non-privileged, sandbox processor mode in response to reading of the sandbox status register.

Example 17 includes the subject matter of any of Examples 1-16, and wherein the trusted domain manager is further to invoke, during execution of the non-privileged exception handler in the native processor mode, the second processor instruction to enter the non-privileged sandbox processor mode.

Example 18 includes a method for untrusted code execution, the method comprising: executing, by a computing device, code included in a native domain of a first virtual address space in a non-privileged, native processor mode; invoking, by the computing device while executing the code in the native processor mode, a first processor instruction to add a memory page to a first sandbox domain of the first virtual address space, wherein the memory page is not included in the native domain; invoking, by the computing device while executing the code in the native processor mode, a second processor instruction to enter the first sandbox domain in response to invoking the first processor instruction; and executing, by the computing device, code included in the first sandbox domain in a non-privileged, sandbox processor mode in response to invoking the second processor instruction.

Example 19 includes the subject matter of Example 18, and wherein executing the code included in the first sandbox domain in the non-privileged, sandbox processor mode comprises: allowing, by a processor of the computing device, access to memory included in the first sandbox domain; and denying, by the processor of the computing device, access to memory not included in the first sandbox domain.

Example 20 includes the subject matter of any of Examples 18 and 19, and wherein denying the access to memory comprises denying read access, write access, and execute access to the memory not included in the first sandbox domain.

Example 21 includes the subject matter of any of Examples 18-20, and wherein denying the access to the memory not included in the first sandbox domain comprises generating, by the processor, a page fault exception.

Example 22 includes the subject matter of any of Examples 18-21, and wherein executing the code included in the first sandbox domain in the non-privileged, sandbox processor mode comprises denying, by a processor of the computing device, execution of a prohibited instruction.

Example 23 includes the subject matter of any of Examples 18-22, and wherein denying the execution of the prohibited instruction comprises generating, by the processor, a general protection fault exception.

Example 24 includes the subject matter of any of Examples 18-23, and further comprising: configuring, by the computing device while executing the user-mode code in the native processor mode, a sandbox state for the first sandbox domain; and invoking, by the computing device, a third processor instruction to set the sandbox state for the first sandbox domain in response to configuring the sandbox state; wherein invoking the second processor instruction comprises invoking the second processor instruction in response to invoking the third processor instruction.

Example 25 includes the subject matter of any of Examples 18-24, and wherein the sandbox state is indicative of a stack pointer that points within the first sandbox domain and an entry point within the first sandbox domain.

Example 26 includes the subject matter of any of Examples 18-25, and further comprising configuring, by a processor of the computing device, a state control block in a memory of the computing device with the sandbox state in response to invoking the third processor instruction.

Example 27 includes the subject matter of any of Examples 18-26, and further comprising: setting, by a processor of the computing device, a sandbox bit in a memory of the computing device in response to invoking the second processor instruction; storing, by the processor, a return address in the memory of the computing device in response to invoking the second processor instruction; loading, by the processor, an execution state from the memory of the computing device in response to invoking the second processor instruction; and jumping, by the processor, to an entry point within the first sandbox domain in response to invoking the second processor instruction.

Example 28 includes the subject matter of any of Examples 18-27, and wherein loading the execution state comprises: loading a stack pointer from the memory to a stack pointer register of the processor; and loading the entry point from the memory to an instruction pointer register of the processor.

Example 29 includes the subject matter of any of Examples 18-28, and wherein: setting the sandbox bit comprises setting a sandbox bit of a state control block in the memory of the computing device; storing the return address comprises storing the return address in the state control block; and loading the execution state comprises loading the execution state from the state control block.

Example 30 includes the subject matter of any of Examples 18-29, and further comprising: invoking, by the computing device while executing the code in the sandbox processor mode, a third processor instruction to exit the first sandbox domain; and executing, by the computing device, the code included in the native domain of the first virtual address space in the non-privileged, native processor mode in response to invoking the third processor instruction.

Example 31 includes the subject matter of any of Examples 18-30, and further comprising: setting, by a processor of the computing device, a sandbox bit in a memory of the computing device in response to invoking the second processor instruction; and clearing, by the processor, the sandbox bit in the memory in response to invoking the third processor instruction.

Example 32 includes the subject matter of any of Examples 18-31, and further comprising: storing, by the processor, a return address that points to the native domain in a memory of the computing device in response to invoking the second processor instruction; and jumping, by the processor, to the return address in response to invoking the third processor instruction.

Example 33 includes the subject matter of any of Examples 18-32, and further comprising: generating, by a processor of the computing device, an exception while executing the code included in the first sandbox domain in the non-privileged, sandbox processor mode; executing, by the computing device, a kernel exception handler in a privileged processor mode in response to generating the exception; invoking, by the computing device, a non-privileged exception handler in the non-privileged, native processor mode in response to executing the kernel exception handler; reading, by the computing device, a sandbox status register of the processor in response to executing the non-privileged exception handler; and determining, by the computing device, whether the exception originated in the non-privileged, sandbox processor mode in response to reading the sandbox status register.

Example 34 includes the subject matter of any of Examples 18-33, and further comprising invoking, by the computing device while executing the non-privileged exception handler in the native processor mode, the second processor instruction to enter the non-privileged sandbox processor mode.

Example 35 includes a computing device comprising: a processor; and a memory having stored therein a plurality of instructions that when executed by the processor cause the computing device to perform the method of any of examples 18-34.

Example 36 includes one or more non-transitory, computer readable storage media comprising a plurality of instructions stored thereon that in response to being executed result in a computing device performing the method of any of examples 18-34.

Example 37 includes a computing device comprising means for performing the method of any of examples 18-34.

Example 38 includes a computing device for untrusted code execution, the computing device comprising: means for executing code included in a native domain of a first virtual address space in a non-privileged, native processor mode; means for invoking, by the computing device while executing the code in the native processor mode, a first processor instruction to add a memory page to a first sandbox domain of the first virtual address space, wherein the memory page is not included in the native domain; means for invoking, by the computing device while executing the code in the native processor mode, a second processor instruction to enter the first sandbox domain in response to invoking the first processor instruction; and means for executing code included in the first sandbox domain in a non-privileged, sandbox processor mode in response to invoking the second processor instruction.

Example 39 includes the subject matter of Example 38, and wherein the means for executing the code included in the first sandbox domain in the non-privileged, sandbox processor mode comprises: means for allowing, by a processor of the computing device, access to memory included in the first sandbox domain; and means for denying, by the processor of the computing device, access to memory not included in the first sandbox domain.

Example 40 includes the subject matter of any of Examples 38 and 39, and wherein the means for denying the access to memory comprises means for denying read access, write access, and execute access to the memory not included in the first sandbox domain.

Example 41 includes the subject matter of any of Examples 38-40, and wherein the means for denying the access to the memory not included in the first sandbox domain comprises means for generating, by the processor, a page fault exception.

Example 42 includes the subject matter of any of Examples 38-41, and wherein the means for executing the code included in the first sandbox domain in the non-privileged, sandbox processor mode comprises means for denying, by a processor of the computing device, execution of a prohibited instruction.

Example 43 includes the subject matter of any of Examples 38-42, and wherein the means for denying the execution of the prohibited instruction comprises means for generating, by the processor, a general protection fault exception.

Example 44 includes the subject matter of any of Examples 38-43, and further comprising: means for configuring, by the computing device while executing the user-mode code in the native processor mode, a sandbox state for the first sandbox domain; and means for invoking a third processor instruction to set the sandbox state for the first sandbox domain in response to configuring the sandbox state; wherein the means for invoking the second processor instruction comprises means for invoking the second processor instruction in response to invoking the third processor instruction.

Example 45 includes the subject matter of any of Examples 38-44, and wherein the sandbox state is indicative of a stack pointer that points within the first sandbox domain and an entry point within the first sandbox domain.

Example 46 includes the subject matter of any of Examples 38-45, and further comprising means for configuring, by a processor of the computing device, a state control block in a memory of the computing device with the sandbox state in response to invoking the third processor instruction.

Example 47 includes the subject matter of any of Examples 38-46, and further comprising: means for setting, by a processor of the computing device, a sandbox bit in a memory of the computing device in response to invoking the second processor instruction; means for storing, by the processor, a return address in the memory of the computing device in response to invoking the second processor instruction; means for loading, by the processor, an execution state from the memory of the computing device in response to invoking the second processor instruction; and means for jumping, by the processor, to an entry point within the first sandbox domain in response to invoking the second processor instruction.

Example 48 includes the subject matter of any of Examples 38-47, and wherein the means for loading the execution state comprises: means for loading a stack pointer from the memory to a stack pointer register of the processor; and means for loading the entry point from the memory to an instruction pointer register of the processor.

Example 49 includes the subject matter of any of Examples 38-48, and wherein: the means for setting the sandbox bit comprises means for setting a sandbox bit of a state control block in the memory of the computing device; the means for storing the return address comprises means for storing the return address in the state control block; and the means for loading the execution state comprises means for loading the execution state from the state control block.

Example 50 includes the subject matter of any of Examples 38-49, and further comprising: means for invoking, by the computing device while executing the code in the sandbox processor mode, a third processor instruction to exit the first sandbox domain; and means for executing the code included in the native domain of the first virtual address space in the non-privileged, native processor mode in response to invoking the third processor instruction.

Example 51 includes the subject matter of any of Examples 38-50, and further comprising: means for setting, by a processor of the computing device, a sandbox bit in a memory of the computing device in response to invoking the second processor instruction; and means for clearing, by the processor, the sandbox bit in the memory in response to invoking the third processor instruction.

Example 52 includes the subject matter of any of Examples 38-51, and further comprising: means for storing, by the processor, a return address that points to the native domain in a memory of the computing device in response to invoking the second processor instruction; and means for jumping, by the processor, to the return address in response to invoking the third processor instruction.

Example 53 includes the subject matter of any of Examples 38-52, and further comprising: means for generating, by a processor of the computing device, an exception while executing the code included in the first sandbox domain in the non-privileged, sandbox processor mode; means for executing a kernel exception handler in a privileged processor mode in response to generating the exception; means for invoking a non-privileged exception handler in the non-privileged, native processor mode in response to executing the kernel exception handler; means for reading a sandbox status register of the processor in response to executing the non-privileged exception handler; and means for determining whether the exception originated in the non-privileged, sandbox processor mode in response to reading the sandbox status register.

Example 54 includes the subject matter of any of Examples 38-53, and further comprising means for invoking, by the computing device while executing the non-privileged exception handler in the native processor mode, the second processor instruction to enter the non-privileged sandbox processor mode.

The invention claimed is:

1. A computing device for untrusted code execution, the computing device comprising:
a processor and a trusted domain manager circuitry to:
execute code included in a native domain of a first virtual address space in a non-privileged, native processor mode of the processor;
invoke, during execution of the code in the native processor mode, a first processor instruction with the processor to add a memory page to a first sandbox domain of the first virtual address space, wherein the memory page is not included in the native domain;
invoke, during the execution of the code in the native processor mode, a second processor instruction with the processor to enter the first sandbox domain in response to invocation of the first processor instruction; and execute code included in the first sandbox domain in a non-privileged, sandbox processor mode of the processor in response to invocation of the second processor instruction, wherein to execute the code included in the first sandbox domain in the non-privileged, sandbox processor mode comprises to allow, by the processor, access to memory included in the first sandbox domain;

wherein the processor comprises a sandbox jump engine to set a sandbox bit in a memory of the computing device in response to invocation of the second processor instruction, wherein the sandbox bit is not included in the first virtual address space.

2. The computing device of claim 1, wherein to execute the code included in the first sandbox domain in the non-privileged, sandbox processor mode further comprises to:
deny, by the processor of the computing device, access to memory not included in the first sandbox domain.

3. The computing device of claim 2, wherein to deny the access to memory comprises to deny read access, write access, and execute access to the memory not included in the first sandbox domain.

4. The computing device of claim 1, wherein to execute the code included in the first sandbox domain in the non-privileged, sandbox processor mode further comprises to deny, by the processor, execution of a prohibited instruction.

5. The computing device of claim 1, wherein the trusted domain manager circuitry is further to:
configure, during the execution of the user-mode code in the native processor mode, a sandbox state for the first sandbox domain; and
invoke a third processor instruction to set the sandbox state for the first sandbox domain in response to configuration of the sandbox state;
wherein to invoke the second processor instruction comprises to invoke the second processor instruction in response to invocation of the third processor instruction.

6. The computing device of claim 1, wherein the sandbox jump engine is further to:
store a return address in the memory of the computing device in response to the invocation of the second processor instruction;
load an execution state from the memory of the computing device in response to the invocation of the second processor instruction; and
jump to an entry point within the first sandbox domain in response to the invocation of the second processor instruction.

7. The computing device of claim 6, wherein to load the execution state comprises to:
load a stack pointer from the memory to a stack pointer register of the processor; and
load the entry point from the memory to an instruction pointer register of the processor.

8. The computing device of claim 1, wherein:
to execute the code in the sandbox processor mode comprises to invoke a third processor instruction to exit the first sandbox domain; and
the trusted domain manager circuitry is further to execute the code included in the native domain of the first virtual address space in the non-privileged, native processor mode in response to invocation of the third processor instruction.

9. The computing device of claim 8, wherein:
the processor includes a sandbox exit engine to clear the sandbox bit in the memory in response to invocation of the third processor instruction.

10. The computing device of claim 1, further comprising a system manager, wherein:
the processor includes a sandbox enforcement engine to generate an exception during execution of the code included in the first sandbox domain in the non-privileged, sandbox processor mode; and
the system manager is to (i) execute a kernel exception handler in a privileged processor mode in response to generation of the exception and (ii) invoke a non-privileged exception handler in the non-privileged, native processor mode in response to execution of the kernel exception handler;
wherein the trusted domain manager circuitry is further to (i) read a sandbox status register of the processor in response to execution of the non-privileged exception handler and (ii) determine whether the exception originated in the non-privileged, sandbox processor mode in response to reading of the sandbox status register.

11. The computing device of claim 10, wherein the trusted domain manager circuitry is further to invoke, during execution of the non-privileged exception handler in the native processor mode, the second processor instruction to enter the non-privileged sandbox processor mode.

12. A method for untrusted code execution, the method comprising:
executing, by a computing device, code included in a native domain of a first virtual address space in a non-privileged, native processor mode of a processor of the computing device;
invoking, by the computing device while executing the code in the native processor mode, a first processor instruction with the processor to add a memory page to a first sandbox domain of the first virtual address space, wherein the memory page is not included in the native domain;
invoking, by the computing device while executing the code in the native processor mode, a second processor instruction with the processor to enter the first sandbox domain in response to invoking the first processor instruction;
setting, by the processor of the computing device, a sandbox bit in a memory of the computing device in response to invoking the second processor instruction, wherein the sandbox bit is not included in the first virtual address space; and
executing, by the computing device, code included in the first sandbox domain in a non-privileged, sandbox processor mode of the processor in response to invoking the second processor instruction, wherein executing the code included in the first sandbox domain in the non-privileged, sandbox processor mode comprises allowing, by the processor, access to memory included in the first sandbox domain.

13. The method of claim 12, wherein executing the code included in the first sandbox domain in the non-privileged, sandbox processor mode further comprises:
denying, by the processor of the computing device, access to memory not included in the first sandbox domain.

14. The method of claim 12, wherein executing the code included in the first sandbox domain in the non-privileged, sandbox processor mode further comprises denying, by the processor, execution of a prohibited instruction.

15. The method of claim 12, further comprising:
configuring, by the computing device while executing the user-mode code in the native processor mode, a sandbox state for the first sandbox domain; and
invoking, by the computing device, a third processor instruction to set the sandbox state for the first sandbox domain in response to configuring the sandbox state;
wherein invoking the second processor instruction comprises invoking the second processor instruction in response to invoking the third processor instruction.

16. The method of claim 12, further comprising:
storing, by the processor, a return address in the memory of the computing device in response to invoking the second processor instruction;
loading, by the processor, an execution state from the memory of the computing device in response to invoking the second processor instruction; and
jumping, by the processor, to an entry point within the first sandbox domain in response to invoking the second processor instruction.

17. The method of claim 12, further comprising:
invoking, by the computing device while executing the code in the sandbox processor mode, a third processor instruction to exit the first sandbox domain; and
executing, by the computing device, the code included in the native domain of the first virtual address space in the non-privileged, native processor mode in response to invoking the third processor instruction.

18. The method of claim 12, further comprising:
generating, by the processor, an exception while executing the code included in the first sandbox domain in the non-privileged, sandbox processor mode;
executing, by the computing device, a kernel exception handler in a privileged processor mode in response to generating the exception;
invoking, by the computing device, a non-privileged exception handler in the non-privileged, native processor mode in response to executing the kernel exception handler;
reading, by the computing device, a sandbox status register of the processor in response to executing the non-privileged exception handler; and
determining, by the computing device, whether the exception originated in the non-privileged, sandbox processor mode in response to reading the sandbox status register.

19. One or more machine-readable storage media comprising a plurality of instructions stored thereon that, in response to being executed, cause a computing device to:
execute code included in a native domain of a first virtual address space in a non-privileged, native processor mode of a processor of the computing device;
invoke, by the computing device while executing the code in the native processor mode, a first processor instruction with the processor to add a memory page to a first sandbox domain of the first virtual address space, wherein the memory page is not included in the native domain;
invoke, by the computing device while executing the code in the native processor mode, a second processor instruction with the processor to enter the first sandbox domain in response to invoking the first processor instruction;
set, by the processor, a sandbox bit in a memory of the computing device in response to invoking the second processor instruction, wherein the sandbox bit is not included in the first virtual address space; and
execute code included in the first sandbox domain in a non-privileged, sandbox processor mode of the processor in response to invoking the second processor instruction, wherein to execute the code included in the first sandbox domain in the non-privileged, sandbox processor mode comprises to allow, by the processor, access to memory included in the first sandbox domain.

20. The one or more machine-readable storage media of claim 19, wherein to execute the code included in the first sandbox domain in the non-privileged, sandbox processor mode further comprises to:
deny, by the processor of the computing device, access to memory not included in the first sandbox domain.

21. The one or more machine-readable storage media of claim 19, wherein to execute the code included in the first sandbox domain in the non-privileged, sandbox processor mode further comprises to deny, by the processor, execution of a prohibited instruction.

22. The one or more machine-readable storage media of claim 19, further comprising a plurality of instructions stored thereon that, in response to being executed, cause the computing device to:
configure, by the computing device while executing the user-mode code in the native processor mode, a sandbox state for the first sandbox domain; and
invoke a third processor instruction to set the sandbox state for the first sandbox domain in response to configuring the sandbox state;
wherein to invoke the second processor instruction comprises to invoke the second processor instruction in response to invoking the third processor instruction.

23. The one or more machine-readable storage media of claim 19, further comprising a plurality of instructions stored thereon that, in response to being executed, cause the computing device to:
store, by the processor, a return address in the memory of the computing device in response to invoking the second processor instruction;
load, by the processor, an execution state from the memory of the computing device in response to invoking the second processor instruction; and
jump, by the processor, to an entry point within the first sandbox domain in response to invoking the second processor instruction.

24. The one or more machine-readable storage media of claim 19, further comprising a plurality of instructions stored thereon that, in response to being executed, cause the computing device to:
invoke, by the computing device while executing the code in the sandbox processor mode, a third processor instruction to exit the first sandbox domain; and
execute the code included in the native domain of the first virtual address space in the non-privileged, native processor mode in response to invoking the third processor instruction.

25. The one or more machine-readable storage media of claim 19, further comprising a plurality of instructions stored thereon that, in response to being executed, cause the computing device to:
generate, by the processor, an exception while executing the code included in the first sandbox domain in the non-privileged, sandbox processor mode;
execute a kernel exception handler in a privileged processor mode in response to generating the exception;
invoke a non-privileged exception handler in the non-privileged, native processor mode in response to executing the kernel exception handler;

read a sandbox status register of the processor in response to executing the non-privileged exception handler; and
determine whether the exception originated in the non-privileged, sandbox processor mode in response to reading the sandbox status register.

* * * * *